UNITED STATES PATENT OFFICE.

MAX MONHAUPT, OF ALTONA-OTTENSEN, GERMANY, ASSIGNOR TO NAAMLOOZE VENNOOTSCHAP ANTON JURGENS VEREENIGDE FABRIKEN, OF OSS, NETHERLANDS.

PROCESS FOR THE MANUFACTURE OF A COLLOIDAL SOLUTION NEUTRAL TO THE TASTE FROM CASEIN AND VEGETABLE ALBUMEN, INCLUDING GLUTEN.

1,326,210.     Specification of Letters Patent.     Patented Dec. 30, 1919.

No Drawing.     Application filed March 25, 1918. Serial No. 224,694.

*To all whom it may concern:*

Be it known that I, MAX MONHAUPT, a citizen of Germany, residing at Altona-Ottensen, Germany, have invented certain new and useful improvements in processes for the manufacture of a colloidal solution neutral to the taste from casein and vegetable albumen, including gluten, of which the following is a specification.

It is known that magnesia is a solvent for casein and that by shaking up casein with magnesia and water a solution is obtained by filtration from which on the addition of spirits of wine, a compound of the base with casein is separated out. The soluble compound thus obtained is strongly alkaline and has therefore an alkaline taste. Further, it has been assumed hitherto that the neutral alkali earth metal salts of casein and of the corresponding compounds of other proteids were difficultly soluble, and in fact insoluble after drying, and therefore attempts have been made to produce neutral soluble alkali earth metal albuminates by the addition of alkaline compounds. In so proceeding, the resulting salts are the more soluble the greater their percentage of alkali. These salts are neutral toward phenolphthalein, but toward other indicators, for instance litmus, and also to the taste, they are alkaline.

I have now discovered that magnesia occupies an exceptional position toward the other alkali earths with reference to the solubilizing of casein. I have succeeded by means of very little magnesia in producing colloidal solutions of casein which are quite neutral to the taste. The acid-free caseins of commerce that are produced in the ordinary way at temperatures not exceeding 50° C. by precipitation from milk freed of fat, are suitable without further preparation, for direct use for the manufacture of a casein derivative that is neutral to the taste and of neutral casein solutions likewise neutral to the taste. In certain circumstances even 1% of magnesia is sufficient, (and a still smaller percentage for well washed casein,) for the purpose of converting it with the use of a suitable quantity of water, into the form of a milk-like solution which can be used for various purposes in cooking and in making confectionery. The sufficiently strong solution may be used as a substitute for the white of egg, which cannot be done with the solution that is obtained from casein by means of sodium bi-carbonate. Whereas the last mentioned solution has a grayish color and cannot be brought into any loosened condition, the casein solution precipitated by magnesia can, with the addition of fat and the like, be worked up for use as substitutes for "creams" and whipped cream or whipped white of egg. The magnesia-casein solution may also be employed as an emulsive agent for fat in the manufacture of artificial milk, also as an emulsive liquid in the manufacture of margarin and the like, and in such cases it constitutes a specially favorable soil for the culture of the bacteria that produce the butter aroma. Above all, a casein-magnesia compound of this kind is very suitable as an ingredient of articles of food. The said compound constitutes a novel preparation of casein which is really neutral to the taste and whose manufacture has been the object of various processes and inventions without said object having been attained.

In its simplest form the improved process for the manufacture of a colloidal solution of casein is carried into effect by mixing the casein in the ground state with about 1–1½% of magnesia, and then mixing it with the aqueous liquid. The solution is best prepared by heating the mixture of casein and magnesia carefully with water or the aqueous liquid. The amount of magnesia to be used is to be ascertained by preliminary tests if necessary. If the casein contains any acid or acid salts, a correspondingly greater addition of magnesia is necessary which will serve to saturate the acid or acid salts, so that only the excess comes into operation as a solvent. In all circumstances 1½% is sufficient for the solution proper. The solution may be concentrated or carefully dried. The dry soluble magnesia-casein may also be prepared by adding to the milk-like solution enough alcohol to completely precipitate the same, and then separating the precipitate from the liquid and carefully drying the precipitate.

According to the improved process for the manufacture of a solution of casein that is neutral to the taste, the magnesia may be replaced wholly or partly by basic magnesium carbonate.

In the same manner as milk casein, all proteids that are insoluble in the pure state, can be rendered soluble by means of magnesia. In particular, milk-like products may be produced according to this process from oil-cake, such as soy bean cake, after the cake has been first freed from the oil, and also from glutens.

The solutions which are obtained from animal and vegetable caseins or proteins and which have no alkaline taste, may be treated subsequently with carbonic acid without causing the casein to separate out in flakes. Normal magnesium carbonate, as well as those carbonates which contain more carbonic acid than the normal carbonate, all have a solvent action upon casein in the presence of water. Dry mixtures of casein with magnesia, basic magnesium carbonate or normal magnesium carbonate may also be converted into a soluble form by mixing with water and then injecting carbonic acid.

An excess of carbonic acid does no harm, possibly because the acidity of the casein is sufficient to displace the weak carbonic acid and thereby produce the desired compound of magnesia and casein.

Solution takes place the more readily, the fresher the precipitated casein used.

It has already been known to produce alkali metal caseinates by injecting carbonic acid. Between alkali metal caseinates and magnesium caseinate there is a fundamental difference with regard to the alkaline condition and solubility. The known process therefore did not disclose the fact that magnesium carbonate has a dissolving or a swelling action upon casein in the presence of carbonic acid.

The process may therefore also be carried into effect by either using normal magnesium carbonate as a solvent in place of magnesia or basic magnesium carbonate, or by treating the mixture of magnesia or of one of the carbonates with casein, vegetable albumen or gluten and water with carbonic acid.

The following are two examples of the way in which this invention may be performed:

1. 1½ kg. of magnesia are mixed with 100 kg. of casein and 1000 kg. of water. Then carbonic acid is injected into the mixture with energetic stirring, until the casein has been dissolved in a colloidal form.

2. 4 kg. of normal magnesium carbonate are thoroughly mixed with 100 kg. of casein and 1000 kg. of water until solution is completed. The solution can if desired be treated subsequently with carbonic acid.

In the production of solutions of casein which has been obtained from skim milk in the usual way at temperatures not exceeding 50° C., sugar may be present without any disadvantage to the solubility of the product. The solutions can be heated and sterilized without flocculent precipitation of the casein.

As the carbonic acid neutralizes any excess of the base that may be present, more than 1½% of magnesia may be employed as such or in the form of one of the carbonates.

In the same manner as in the case of casein (milk casein), a corresponding solution of vegetable casein may be produced. In such a case, more especially for the manufacture of solutions of vegetable casein that are neutral to the taste, the process may be carried into effect by treating the defatted substance containing the vegetable casein, with the solvent and carbonic acid while in a heated state.

In treating mixtures of casein and gluten, access of air has an injurious influence upon the solubility of the resulting product. The greater the extent to which the air has access, the less soluble will be the final product. This drawback is remedied by preventing or limiting the access of air.

Preferably only such casein should be employed which has been precipitated at the lowest possible temperature (about 40–50° C.), and which if it is not used in the fresh state, has been dried at that temperature. If higher temperatures are employed, the casein that is obtained with the calculated amount of magnesia, is dissolved only to a small extent, and even in the case of a greater addition of magnesia, that is to say, with an alkaline condition of the liquid, only a partial solution or swelling takes place.

When the casein is of the proper kind, an addition of 8 parts of magnesia to 1000 parts of casein will produce a milk-like solution which is quite neutral and has even a trace of acidity toward litmus and a strong acidity toward phenolphthalein.

I claim:

1. A process for the manufacture of a colloidal solution from proteid material, such product being neutral to the taste, which comprises treating such proteid material with a magnesium compound capable of neutralizing acids, the quantity of the magnesium compound, not required for neutralizing the acid reaction of the proteid and calculated as magnesia, not exceeding one and a half per cent. by weight of the proteid.

2. A process for the manufacture of a colloidal solution from proteid material, such product being neutral to the taste, which comprises treating such proteid material with a magnesium compound capable of neutralizing acids and carbonic acid, the quantity of the magnesium compound, not required for neutralizing the acid reaction of the proteid and calculated as magnesia, not exceeding one and a half per cent. by weight of the proteid.

3. A process for the manufacture of a colloidal solution from proteid material, such product being neutral to the taste, which comprises treating such proteid material with a magnesium compound capable of neutralizing acids under exclusion of air and at an elevated temperature, the quantity of the magnesium compound, not required for neutralizing the acid reaction of the proteid and calculated as magnesia, not exceeding one and a half per cent. by weight of the proteid.

4. A process for the manufacture of a colloidal solution from casein, such product being neutral to the taste, which consists in treating the casein with magnesia, the quantity of magnesia not required for neutralizing the acid reaction of the casein, not exceeding one and a half per cent. by weight of the casein.

5. A process for the manufacture of a colloidal solution neutral to the taste from casein, which consists in treating the casein with a magnesium carbonate, the quantity of the magnesium carbonate, not required for neutralizing the acid reaction of the casein and calculated as magnesia, not exceeding one and a half per cent. by weight of the casein.

6. A process for the manufacture of a colloidal solution neutral to the taste from casein, which consists in treating the casein with a basic magnesium carbonate, the proportion of such carbonate not required for neutralizing the acid reaction of the casein, and calculated as magnesia, not exceeding one and a half per cent. by weight of the casein.

In testimony whereof I affix my signature.

MAX MONHAUPT.